US008923255B2

(12) United States Patent
Wang et al.

(10) Patent No.: US 8,923,255 B2
(45) Date of Patent: Dec. 30, 2014

(54) UPLINK CONTROL CHANNEL RESOURCE COLLISION AVOIDANCE IN CARRIER AGGREGATION SYSTEMS

(75) Inventors: Yiping Wang, Allen, TX (US); Mark Andrew Earnshaw, Kanata (CA); Jun Li, Richardson, TX (US)

(73) Assignee: BlackBerry Limited, Waterloo, Ontario (CA)

(*) Notice: Subject to any disclaimer, the term of this patent is extended or adjusted under 35 U.S.C. 154(b) by 0 days.

(21) Appl. No.: 13/425,341

(22) Filed: Mar. 20, 2012

(65) Prior Publication Data

US 2013/0242815 A1 Sep. 19, 2013

Related U.S. Application Data

(60) Provisional application No. 61/612,186, filed on Mar. 16, 2012.

(51) Int. Cl.
*H04B 7/212* (2006.01)

(52) U.S. Cl.
USPC .......................................................... 370/337

(58) Field of Classification Search
USPC .................................. 370/449, 337
See application file for complete search history.

(56) References Cited

U.S. PATENT DOCUMENTS

| 7,924,754 | B2 | 4/2011 | Bergman et al. |
| 8,122,313 | B2 | 2/2012 | Wang et al. |
| 8,125,941 | B2 | 2/2012 | Trainin et al. |
| 8,520,757 | B2 * | 8/2013 | Kishiyama et al. ............ 375/261 |
| 8,565,066 | B2 * | 10/2013 | Nam et al. ..................... 370/215 |
| 2009/0247174 | A1 | 10/2009 | Zhang et al. |
| 2009/0265599 | A1 | 10/2009 | Chae et al. |
| 2010/0232382 | A1 | 9/2010 | Gauvreau et al. |
| 2011/0243066 | A1 | 10/2011 | Nazar et al. |
| 2011/0319068 | A1 | 12/2011 | Kim et al. |
| 2012/0106478 | A1 | 5/2012 | Han et al. |
| 2012/0113907 | A1 | 5/2012 | Baldemair et al. |
| 2012/0155337 | A1 | 6/2012 | Park |
| 2012/0257554 | A1 | 10/2012 | Kim et al. |

FOREIGN PATENT DOCUMENTS

WO 2011/132721 10/2011

OTHER PUBLICATIONS

Huawei; "Resource Allocation for Uplink ACK/NACK Multiplexing"; 3GPP TSG RAN WG1 Meeting #62 (R1-104282); Madrid, Spain; Aug. 23-27, 2010; 5 pages.
Samsung; "PUCCH HARQ-ACK Resource Mapping for DL CA"; 3GPP TSG RAN WG1 #62 (R1-104582); Madrid, Spain; Aug. 23-28, 2010; 3 pages.
Samsung; "UCCH HARQ-ACK Resource Indexing for CL CA"; 3GPP TSG RAN WG1 #61 (R1-103002); Montreal, Canada; May 10-14, 2010; 3 pages.
International Search Report and Written Opinion of the International Searching Authority issued in International Application No. PCT/US2012/051043 on Feb. 6, 2013; 22 pages.

(Continued)

*Primary Examiner* — Chandrahas Patel
(74) *Attorney, Agent, or Firm* — Fish & Richardson P.C.

(57) ABSTRACT

Systems, apparatuses, and methods of a wireless communications network include identifying a first downlink control channel. The possibility of an acknowledgement/negative acknowledgement (ACK/NACK) resource collision on a first uplink control channel is determined for a first component carrier and a second uplink control channel for a second carrier component. A second downlink control channel can be identified to avoid the ACK/NACK resource collision.

19 Claims, 8 Drawing Sheets

(56) References Cited

OTHER PUBLICATIONS

International Search Report and Written Opinion of the International Searching Authority issued in International Application No. PCT/US2012/051045 on Feb. 6, 2013; 25 pages.
Research in Motion, UK Limited; "Design of HARQ and Scheduling Timing Linkage to Support Inter-band CA with Different TDD Configurations"; 3GPP TSG RAN WG1 Meeting #68; R1-120336; Feb. 6-10, 2012; Dresden, Germany; 4 pages.
MCC Support; "Final Report of 3GPP TSG RAN WG1 #66 v1.0.0"; 3GPP TSG WG1 Meeting #66bis; R1-112886; Oct. 10-14, 2011; Zhuhai, China; 104 pages.
MCC Support; "Final Report of 3GPP TSG RAN WG1 #66bis v1.0.0, Zhuhai, P. R. China, Oct. 10-14, 2011"; 3GPP TSG RAN WG1 Meeting #67; R1-114352; San Francisco, USA, Nov. 14-18, 2011; 84 pages.
MCC Support; "Final Report of 3GPP TSG RAN WG1 #67 v1.0.0 San Francisco, USA, Nov. 14-18, 2011"; 3GPP TSG RAN WG1 Meeting #68; R1-120001; Dresden, Germany, Feb. 6-10, 2012; 89 pages.
Catt; "Design of TDD Inter-band Carrier Aggregation"; 3GPP TSG RAN WG1 Meeting #67 (R1-113724); San Francisco, California; Nov. 14-18, 2001; 6 pages.
Catt; "TDD Inter-band Carrier Aggregation"; 3GPP TSG RAN WG1 Meeting #68 (R1-120091); Dresden, Germany; Feb. 6-10, 2012; 4 pages.
Huawei; "Simultaneous Transmission of CQI, ACK/NACK or SRI on PUCCH in Carrier Aggregation"; 3GPP TSG RAN WG1 Meeting #61bis (R1-103887); Dresden, Germany; Jun. 28-Jul. 2, 2010; 8 pages.
Intel Corporation; "Discussion on HARQ Feedback of TDD Inter-band Carrier Aggregation"; 3GPP TSG-RAN WG1 #67 (R1-113951); San Francisco, California; Nov. 14-18, 2011; 6 pages.
LG Electronics; "Details on Full-Duplex Based TDD CA with Different UL-DL Configurations"; 3GPP TSG RAN WG1 #69 (R1-122273); Prague, Czech Republic; May 21-25, 2012; 9 pages.
MediaTek Inc.; "Discussion on HARQ Feedback Mechanism and Cross-Carrier Scheduling in Inter-band CA with Different TDD UL-DL Configurations"; 3GPP TSG-RAN WG1 Meeting #67 (R1-113864); San Francisco, California; Nov. 14-18, 2011; 6 pages.
Motorola; "Uplink ACK/NACK Transmission Format for Carrier Aggregation" 3GPP TSG RAN1#61bis (R1-103934); Dresden, Germany; Jun. 28-Jul. 2, 2010; 3 pages.
New Postcom; "Discussion on TDD Inter-band CA with Different UL-DL Configuration"; 3GPP TSG RAN WG1 Meeting #67 (R1-113685); San Francisco, California; Nov. 14-18, 2011; 6 pages.
Nokia, Nokia Siemens Networks; "UL ACK/NAK Feedback in LTE-A TDD"; 3GPP TSG RAN WG1 Meeting #60 (R1-101419); San Francisco, California; Feb. 22-26, 2010; 4 pages.
Pantech; "Discussion on Specification Impacts of Different TDD UL-DL Configuration"; 3GPP TSG RAN1 #67 (R1-113829); San Francisco, California; Nov. 14-18, 2011; 5 pages.
Research in Motion UK Limited; "Design of HARQ and Scheduling Timing Linkage to Support Inter-band CA with Different TDD Configurations"; 3GPP TSG RAN WG1 Meeting #68 (R1-120336); Dresden, Germany; Feb. 6-10, 2012; 4 pages.

International Search Report and Written Opinion of the International Searching Authority issued in International Application No. PCT/US2012/051037 on Oct. 23, 2012; 12 pages.
International Search Report and Written Opinion of the International Searching Authority issued in International Application No. PCT/US2012/051042 on Oct. 23, 2012; 12 pages.
Invitation to Pay Additional Fees and Partial International Search Report issued in International Application No. PCT/US2012/051045 on Nov. 21, 2012; 5 pages.
LG Electronics; "Resource Allocation for ACK/NACK PUCCH"; 3GPP TSG RAN WG1 #61bis (R1-103728); Dresden, Germany; Jun. 28-Jul. 2, 2010; 6 pages.
Pantech; "View on Open Questions for CA with Different TDD Configuration"; 3GPP TSG RAN1 #68 (R1-120316); Dresden, Germany; Feb. 6-10, 2012; 7 pages.
Qualcomm Incorporated; "Conveying Multiple ACKs on UL in Support of CA"; 3GPP TSG RAN WG1 #60bis (R1-102320); Beijing, China; Apr. 12-16, 2010; 5 pages.
Invitation to Pay Additional Fees and Partial International Search Report issued in International Application No. PCT/US2012/051043 on Nov. 15, 2012; 6 pages.
Office Action issued in U.S. Appl. No. 13/425,088 on Feb. 21, 2014; 17 pages.
Office Action issued in U.S. Appl. No. 13/425,268 on Feb. 20, 2014; 12 pages.
Office Action issued in U.S. Appl. No. 13/425,299 on Sep. 11, 2013; 11 pages.
Office Action issued in U.S. Appl. No. 13/425,088 on Oct. 11, 2013; 17 pages.
Office Action issued in U.S. Appl. No. 13/425,268 on Oct. 11, 2013; 11 pages.
Office Action issued in U.S. Appl. No. 13/425,299 on Feb. 3, 2014; 13 pages.
International Preliminary Report on Patentability under Chapter I issued in International Application No. PCT/US2012/051037 on Sep. 25, 2014; 8 pages.
International Preliminary Report on Patentability under Chapter I issued in International Application No. PCT/US2012/051042 on Sep. 25, 2014; 7 pages.
International Preliminary Report on Patentability under Chapter I issued in International Application No. PCT/US2012/051043 on Sep. 25, 2014; 14 pages.
International Preliminary Report on Patentability under Chapter I issued in International Application No. PCT/US2012/051045 on Sep. 25, 2014; 16 pages.
3GPP TS 36.211 V10.4.0 (Dec. 2011); 3rd Generation Partnership Project; Technical Specification Group Radio Access Network; Evolved Universal Terrestrial Radio Access (E-UTRA); Physical Channels and Modulation Release 10); 101 pages.
3GPP TS 36.213 V10.4.0 (Dec. 2011); 3rd Generation Partnership Project; Technical Specification Group Radio Access Network; Evolved Universal Terrestrial Radio Access (E-UTRA); Physical Layer Procedures (Release 10); 125 pages.
MCC Support; Final Report of 3GPP TSG RAN WG1 #66 v1.0.0; Aug. 22-26, 2011; Athens, Greece; R1-112886.
MCC Support; Final Report of 3GPP TSG RAN WG1 #68 v1.0.0 (Dresden, Germany, Feb. 6-10, 2012); R1-120951.

* cited by examiner

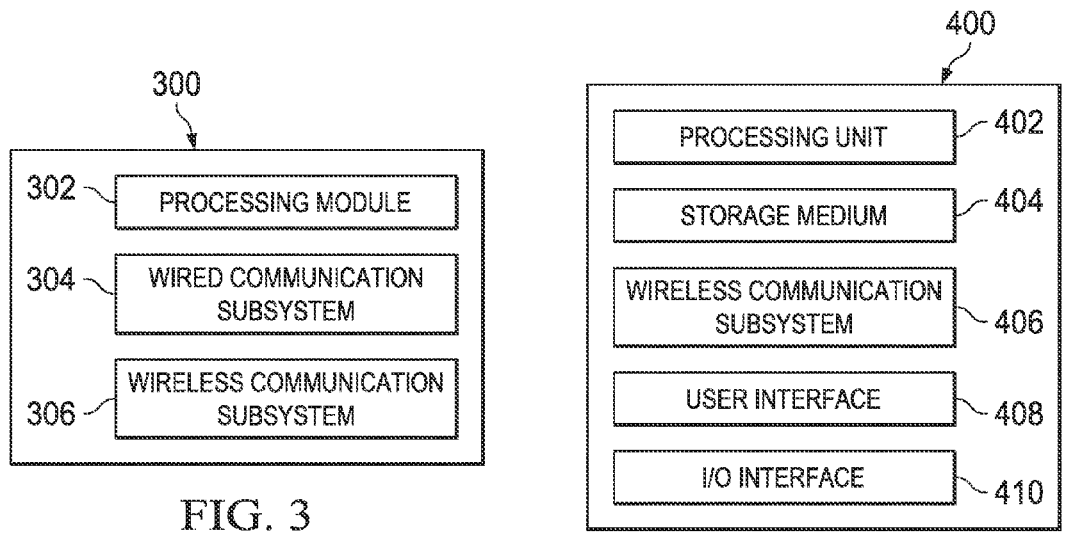
FIG. 3
FIG. 4
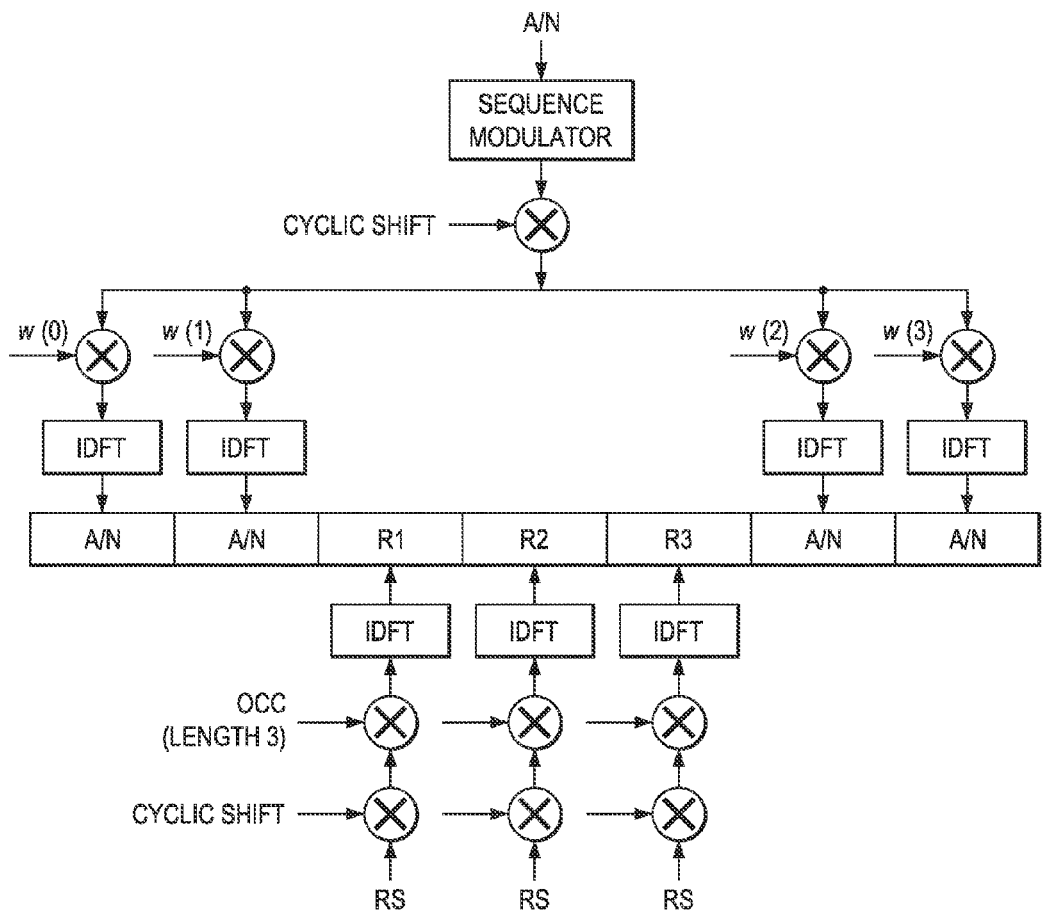
FIG. 5

US 8,923,255 B2

UPLINK CONTROL CHANNEL RESOURCE COLLISION AVOIDANCE IN CARRIER AGGREGATION SYSTEMS

CLAIM OF PRIORITY

This application claims priority under 35 U.S.C. §119(e) to U.S. Provisional Patent Application No. 61/612,186 filed Mar. 16, 2012.

FIELD

The present disclosure pertains to uplink control channel resource collisions, and more particularly to physical uplink control channel resource collisions that may occur in systems using in inter-band carrier aggregation with different TDD UL/DL configurations.

BACKGROUND

In wireless communications systems, such as long term evolution (LTE) systems, downlink and uplink transmissions may be organized into two duplex modes: frequency division duplex (FDD) mode and time division duplex (TDD) mode. The FDD mode uses a paired spectrum where the frequency domain is used to separate the uplink (UL) and downlink (DL) transmissions. FIG. 1A is a graphical illustration of an uplink and downlink subframe separated in the frequency domain for the FDD mode. In TDD systems, an unpaired spectrum may be used where both UL and DL are transmitted over the same carrier frequency. The UL and DL are separated in the time domain. FIG. 1B is a graphical illustration of uplink and downlink subframes sharing a carrier frequency in the TDD mode. In LTE-Advanced, carrier aggregation allows expansion of effective bandwidth delivered to a user terminal through concurrent utilization of radio resources across multiple carriers. Multiple component carriers are aggregated to form a larger overall transmission bandwidth. Carrier aggregation may be performed in LTE-Advanced TDD or LTE-Advanced FDD systems.

DESCRIPTION OF THE DRAWINGS

FIG. 3 is a schematic block diagram illustrating an access node device according to one embodiment.

FIG. 4 is a schematic block diagram illustrating a user equipment device according to one embodiment.

FIG. 5 is a schematic diagram of a physical uplink control channel format 1a/1b slot structure with normal cyclic prefix.

DETAILED DESCRIPTION

The present disclosure pertains to uplink control channel resource collisions, and more particularly to physical uplink control channel resource collision that may occur in systems using carrier aggregation. Specific embodiments described herein relate to physical uplink control channel (PUCCH) resources in a system using inter-band carrier aggregation with different UL/DL TDD configurations. In the various implementations described in this disclosure, PUCCH resources may be used more effectively by avoiding, preventing, detecting, resolving, or mitigating various types of PUCCH resource collisions described herein.

In certain aspects, systems, method, and apparatuses of a wireless network can identify a first downlink control channel and a second downlink control channel. A first uplink control channel resource depends upon the first downlink control channel, and a second uplink control channel resource depends upon the second downlink control channel. The existence of an acknowledgement/negative acknowledgement (ACK/NACK) resource collision between the first uplink control channel can be identified or determined. A third downlink control channel can be identified to avoid the ACK/NACK resource collision. The downlink control channels may comprise a physical downlink control channel (PDCCH).

In certain aspects, a first downlink control channel can be identified. The possibility of an acknowledgement/negative acknowledgement (ACK/NACK) resource collision on a first uplink control channel for a first component carrier and a second uplink control channel for a second carrier component can be determined. A third uplink control channel can be identified to avoid the ACK/NACK resource collision. In certain implementations, the third uplink control channel may include signaling the third uplink control channel different from the first uplink control channel. The third uplink control channel may include a physical uplink control channel (PUCCH). In certain implementations, the third uplink control channel can be communicated using at least one transmit power control (TPC) bit of the second component carrier. The third uplink control channel can be communicated using at least one TPC bit associated with one or both of the first component carrier or the second component carrier.

Figure 1A:
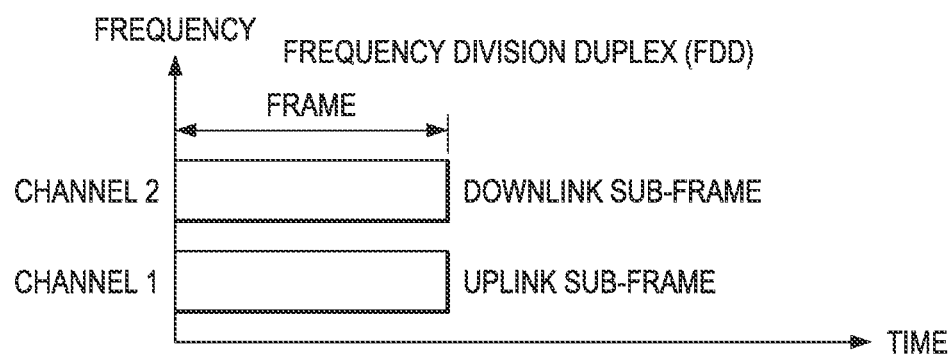
FIG. 1A is a graphical illustration of an uplink and downlink subframe separated in the frequency domain for the FDD mode.
Figure 1B:
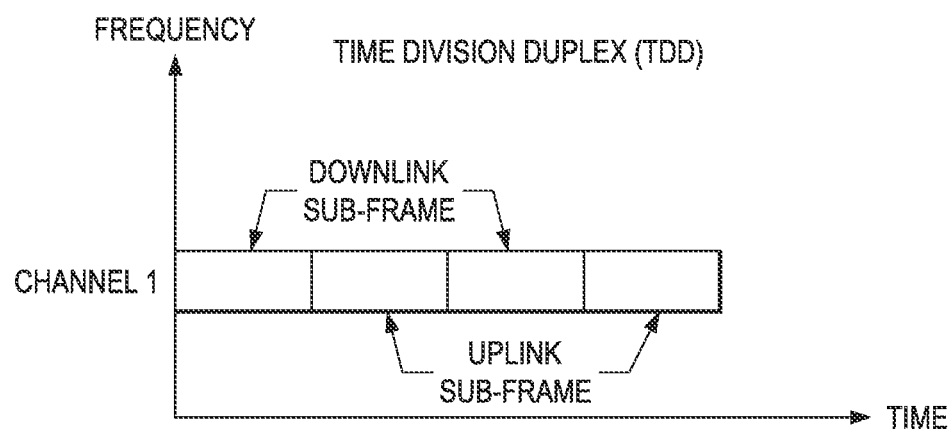
FIG. 1B is a graphical illustration of uplink and downlink subframes sharing a carrier frequency in the TDD mode.
Figure 2:
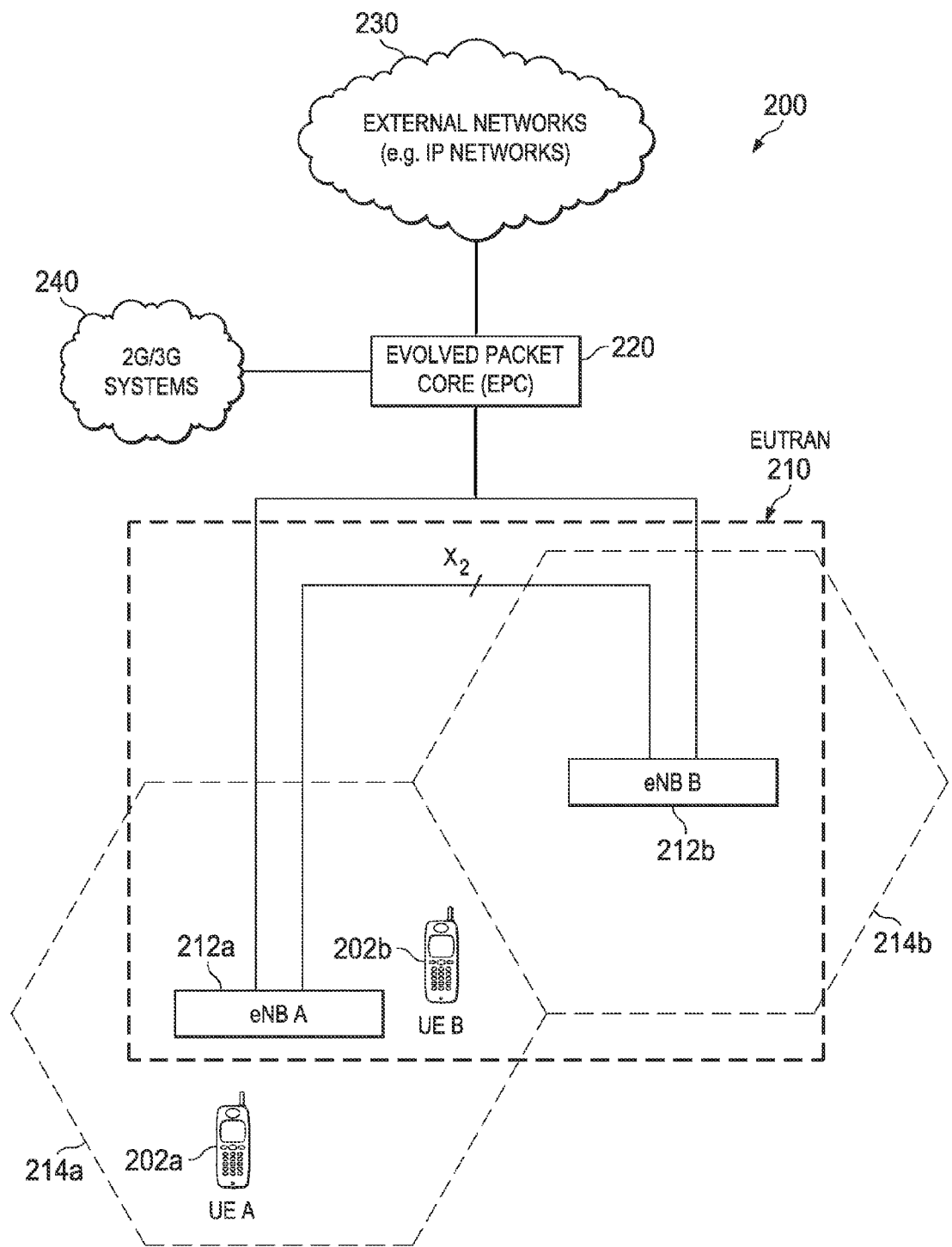
FIG. 2 is a schematic representation of an example wireless cellular communication system based on 3GPP long term evolution (LTE).

Mobile electronic devices may operate in a communications network, such as the network shown in FIG. 2, which is based on the third generation partnership project (3GPP) long term evolution (LTE), also known as Evolved Universal Terrestrial Radio Access (E-UTRA). More specifically, FIG. 2 is a schematic representation of an example wireless communication system 200 based on 3GPP LTE. The system 200 shown in FIG. 2 includes a plurality of base stations 212 (i.e., 212a and 212b). In the LTE example of FIG. 2, the base stations are shown as evolved Node B (eNB) 212a,b. In this disclosure, references to eNB are intended to refer to an access node device, such as a base station or any other communications network node that provides service to a mobile station including femtocell, picocell, or the like. The example wireless communication system 200 of FIG. 2 may include one or a plurality of radio access networks 210, core networks (CNs) 220, and external networks 230. In certain implementations, the radio access networks may be Evolved Universal Mobile Telecommunications System (UMTS) terrestrial radio access networks (EUTRANs). In addition, in certain instances, core networks 220 may be evolved packet cores (EPCs). Further, there may be one or more mobile electronic devices 202 obtaining communication services via the example wireless communication system 200. In some implementations, 2G/3G systems 240, e.g., Global System for Mobile communication (GSM), Interim Standard 95 (IS-95), Universal Mobile Telecommunications System (UMTS) and CDMA2000 (Code Division Multiple Access) may also be integrated into the communication system 200.

In the example LTE system shown in FIG. 2, the EUTRAN 210 includes eNB 212a and eNB 212b. Cell 214a is the service area of eNB 212a and Cell 214b is the service area of eNB 212b. The term cell is intended to describe a coverage area associated with a base station regardless and may or may not overlap with the coverage areas associated with other base stations. In FIG. 2, User Equipment (UE) 202a and UE 202b operate in Cell 214a and are served by eNB 212a. The EUTRAN 210 can include one or a plurality of eNBs 212 and one or a plurality of UEs can operate in a cell. The eNBs 212 communicate directly to the UEs 202. In some implementations, the eNB 212 may be in a one-to-many relationship with the UE 202, e.g., eNB 212a in the example LTE system 200 can serve multiple UEs 202 (i.e., UE 202a and UE 202b) within its coverage area Cell 214a, but each of UE 202a and UE 202b may be connected only to one eNB 212a at a time. In some implementations, the eNB 212 may be in a many-to-many relationship with the UEs 202, e.g., UE 202a and UE 202b can be connected to eNB 212a and eNB 212b. The eNB 212a may be connected to eNB 212b with which handover may be conducted if one or both of UE 202a and UE 202b travels from cell 214a to cell 214b. UE 202 may be any communications device used by an end-user to communicate, for example, within the LTE system 200. The UE 202 may alternatively be referred to as mobile electronic device, user equipment, user device, mobile device, mobile station, subscriber station, or wireless terminal. In some embodiments, UE 202 may be a cellular phone, personal data assistant (PDA), smart phone, laptop, tablet personal computer (PC), pager, portable computer, or other types of mobile communications device, including communications apparatus used in wirelessly connected automobiles, appliances, or clothing.

UEs 202 may transmit voice, video, multimedia, text, web content and/or any other user/client-specific content. On the one hand, the transmission of some of these contents, e.g., video and web content, may require high channel throughput to satisfy the end-user demand. On the other hand, the channel between UEs 202 and eNBs 212 may be contaminated by multipath fading, due to the multiple signal paths arising from many reflections in the wireless environment. Accordingly, the UEs' transmission may adapt to the wireless environment. In short, UEs 202 generate requests, send responses or otherwise communicate in different means with Enhanced Packet Core (EPC) 220 and/or Internet Protocol (IP) networks 230 through one or more eNBs 212.

A radio access network is part of a mobile telecommunication system which implements a radio access technology, such as UMTS, CDMA2000, and 3GPP LTE. In many applications, the Radio Access Network (RAN) included in a LTE telecommunications system 200 is called an EUTRAN 210. The EUTRAN 210 can be located between UEs 202 and EPC 220. The EUTRAN 210 includes at least one eNB 212. The eNB can be a radio base station that may control all or at least some radio related functions in a fixed part of the system. The at least one eNB 212 can provide radio interface within their coverage area or a cell for UEs 202 to communicate. eNBs 212 may be distributed throughout the communications network to provide a wide area of coverage. The eNB 212 directly communicates to one or a plurality of UEs 202, other eNBs, and the EPC 220.

The eNB 212 may be the end point of the radio protocols towards the UE 202 and may relay signals between the radio connection and the connectivity towards the EPC 220. In certain implementations, the EPC 220 is the main component of a core network (CN). The CN can be a backbone network, which may be a central part of the telecommunications system. The EPC 220 can include a mobility management entity (MME), a serving gateway (SGW), and a packet data network gateway (PGW). The MME may be the main control element in the EPC 220 responsible for the functionalities including the control plane functions related to subscriber and session management. The SGW can serve as a local mobility anchor, such that the packets are routed through this point for intra EUTRAN 210 mobility and mobility with other legacy 2G/3G systems 240. The SGW functions may include the user plane tunnel management and switching. The PGW may provide connectivity to the services domain including external networks 230, such as the IP networks. The UE 202, EUTRAN 210, and EPC 220 are sometimes referred to as the evolved packet system (EPS). It is to be understood that the architectural evolvement of the LTE system 200 is focused on the EPS. The functional evolution may include both EPS and external networks 230.

Though described in terms of FIG. 2, the present disclosure is not limited to such an environment. In general, telecommunication systems may be described as communications networks made up of a number of radio coverage areas, or cells that are each served by a base station or other fixed transceiver. Example telecommunication systems include Global System for Mobile Communication (GSM) protocols, Universal Mobile Telecommunications System (UMTS), 3GPP Long Term Evolution (LTE), and others. In addition to telecommunication systems, wireless broadband communication systems may also be suitable for the various implementations described in the present disclosure. Example wireless broadband communication systems include IEEE 802.11 wireless local area network, IEEE 802.16 WiMAX network, etc.

Referring to FIG. 3, an access node device (for example, eNB 212a in FIG. 2) according to one embodiment will be described below. The illustrated device 300 includes a processing module 302, a wired communication subsystem 304, and a wireless communication subsystem 306. The processing module 302 can include a processing component (alternatively referred to as "processor" or "central processing unit (CPU)") capable of executing instructions related to one or more of the processes, steps, or actions described above in connection with one or more of the embodiments disclosed herein. The processing module 302 can also include other auxiliary components, such as random access memory (RAM), read only memory (ROM), secondary storage (for example, a hard disk drive or flash memory). The processing module 302 can execute certain instructions and commands to provide wireless or wired communication, using the wired communication subsystem 304 or the wireless communication subsystem 306. A skilled artisan will readily appreciate that various other components can also be included in the device 300.

FIG. 4 is a schematic block diagram illustrating a user equipment device (for example, UEs 202a, 202b in FIG. 2) according to one embodiment. The illustrated device 400 includes a processing unit 402, a computer readable storage medium 404 (for example, ROM or flash memory), a wireless communication subsystem 406, a user interface 408, and an I/O interface 410.

Similar to the processing module 302 of FIG. 3, the processing unit 402 can include a processing component configured to execute instructions related to one or more of the processes, steps, or actions described above in connection with one or more of the embodiments disclosed herein. The processing unit 402 can also include other auxiliary components, such as random access memory (RAM) and read only memory (ROM). The computer readable storage medium 404 can store an operating system (OS) of the device 400 and various other computer executable software programs for performing one or more of the processes, steps, or actions described above.

The wireless communication subsystem 406 is configured to provide wireless communication for data and/or control information provided by the processing unit 402. The wireless communication subsystem 406 can include, for example, one or more antennas, a receiver, a transmitter, a local oscillator, a mixer, and a digital processing (DSP) unit. In some embodiments, the wireless communication subsystem 406 can support a multiple input multiple output (MIMO) protocol.

The user interface 408 can include, for example, a screen or touch screen (for example, a liquid crystal display (LCD), a light emitting display (LED), an organic light emitting display (OLED), a microelectromechanical system (MEMS) display), a keyboard or keypad, a trackball, a speaker, or a microphone. The I/O interface 410 can include, for example, a universal serial bus (USB) interface. A skilled artisan will readily appreciate that various other components can also be included in the device 400.

In the 3GPP LTE TDD system, a subframe of a radio frame can be a downlink, an uplink or a special subframe (the special subframe includes downlink and uplink time regions separated by a guard period for downlink to uplink switching). Currently, there are seven different UL/DL configuration schemes that may be used in LTE TDD operations, as shown in Table 1 below. Table 1 shows LTE TDD Uplink-Downlink Configurations. D represents downlink subframes, U represents uplink subframes and S represents special subframes. In each special subframe S, there are three parts which are: i) the downlink pilot time slot (DwPTS), ii) the guard period (GP) and iii) the uplink pilot time slot (UpPTS). Downlink transmissions on the physical downlink shared channel (PDSCH) may be made in DL subframes or in the DwPTS portion of a special subframe. Uplink transmissions on the physical uplink control channel (PUCCH) or physical uplink shared channel (PUSCH) may only be made in UL subframes, since the UpPTS portion of a special subframe is too short to accommodate these channels.

TABLE 1

LTE TDD Uplink-Downlink Configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in Table 1, there are two switch point periodicities specified in the LTE standard, 5 ms and 10 ms. 5 ms switch point periodicity is introduced to support the co-existence between LTE and low chip rate UTRA TDD systems, and 10 ms switch point periodicity is for the coexistence between LTE and high chip rate UTRA TDD systems. The supported configurations cover a wide range of UL/DL allocations from "DL heavy" 1:9 ratio to "UL heavy" 3:2 ratio. (The DL allocations in these ratios include both DL subframes and special subframes (which can also carry downlink transmissions in DwPTS).) Therefore, compared to FDD, TDD systems have more flexibility in terms of the proportion of resources assignable to uplink and downlink communications within a given amount of spectrum. Specifically, it is possible to unevenly distribute the radio resources between uplink and downlink. This will provide a way to utilize the radio resources more efficiently by selecting an appropriate UL/DL configuration based on interference situation and different traffic characteristics in DL and UL.

As understood to persons of skill in the art, UL (or DL) transmissions do not occur in every subframe in an LTE TDD system. Since the UL and DL transmissions are not continuous, scheduling and hybrid automatic repeat request (HARQ) timing relationships for an LTE TDD system are defined in the specifications. Currently, the HARQ ACK/NACK timing relationship for downlink is defined in Table 2 below. Table 2 may be used to show which uplink subframes should carry uplink HARQ ACK/NACK transmissions associated with M multiple downlink subframes. Table 2 shows downlink association set index K: $\{k_0, k_1, \ldots k_{M-1}\}$. It associates an UL sub-frame n, which conveys ACK/NACK, with DL subframes $n-k_i$, i=0 to M-1.

TABLE 2

Downlink Association Set Index K: $\{k_0, k_1, \ldots k_{M-1}\}$

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |

TABLE 2-continued

Downlink Association Set Index K: $\{k_0, k_1, \ldots k_{M-1}\}$

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

As an illustrative example, when using TDD UL/DL configuration 6, there are uplink subframes that occur in subframes 2, 3, 4, 7, and 8. (see also UL/DL configuration 6 in Table 1). Referring to Table 2, for the UL/DL configuration 6, at subframe 2, the downlink association set index K: $\{k_0, k_1, \ldots k_{M-1}\}$ can be represented as K: $\{7\}$.

The uplink HARQ ACK/NACK timing linkage is shown in Table 3 below. As understood to a person of skill in the art, a timing linkage represents a relationship between when downlink data is transmitted in downlink subframes and when corresponding HARQ ACK/NACK feedback is transmitted in one or more subsequent uplink subframes. Table 3 shows k values for HARQ ACK/NACK. It indicates that the physical hybrid ARQ indicator channel (PHICH) ACK/NACK received in DL sub-frame i is linked with the UL data transmission in UL sub-frame i-k, k is given in Table 3. In addition, for UL/DL configuration 0, in sub-frames 0 and 5, when $I_{PHICH}=1$, k=6. This is because there may be two ACK/NACKs for a UE transmitted on the PHICH in subframes 0 and 5.

TABLE 3 k for HARQ ACK/NACK

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | | 4 | | 6 |
| 2 | | | 6 | | | | | 6 | | |
| 3 | 6 | | | | | | | 6 | 6 | |
| 4 | | | | | | | | 6 | 6 | |
| 5 | | | | | | | 6 | | | |
| 6 | | 6 | 4 | | | | 7 | 4 | | 6 |

The UL grant, ACK/NACK and transmission/retransmission relationship is in Table 4 below. Table 4 shows k values for physical uplink shared channel (PUSCH) transmission. The UE shall upon detection of a physical downlink control channel (PDCCH) with DCI format 0 and/or a PHICH transmission in sub-frame n intended for the UE, adjust the corresponding PUSCH transmission in sub-frame n+k, with k given in Table 4.

For TDD UL/DL configuration 0, if the LSB of the UL index in the DCI format 0 is set to 1 in sub-frame n or a PHICH is received in sub-frame n=0 or 5 in the resource corresponding to $I_{PHICH}=1$, or PHICH is received in sub-frame n=1 or 6, the UE shall adjust the corresponding PUSCH transmission in sub-frame n+7. If, for TDD UL/DL configuration 0, both the most significant bit (MSB) and least significant bit (LSB) of the UL index field in the DCI format 0 are set in sub-frame n, the UE shall adjust the corresponding PUSCH transmission in both sub-frames n+k and n+7, with k given in Table 4.

TABLE 4 k for PUSCH transmission

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Both grant and HARQ timing linkage in TDD are more complicated than the fixed time linkages used in an LTE FDD system.

The physical uplink control channel (PUCCH) format 1a/1b may be used to transmit the ACK/NACK signalling (when ACK/NACK is not multiplexed into a PUSCH transmission). The slot structure of PUCCH formats 1a and 1b with normal cyclic prefix is shown in FIG. 5. FIG. 5 is a schematic diagram of a physical uplink control channel format 1a/1b slot structure with normal cyclic prefix. Each format 1a/1b PUCCH is in a subframe made up of two slots. The same modulation symbol is used in both slots. Without channel selection, formats 1a and 1b carry one and two ACK/NACK bits, respectively. These bits are encoded into the modulation symbol using either BPSK or QPSK modulation based on the number of ACK/NACK bits. The symbol is multiplied by a cyclic-shifted sequence with length-12. Then, the samples are mapped to the 12 subcarriers which the PUCCH is to occupy and then converted to the time domain via an IDFT. The spread signal is then multiplied with an orthogonal cover sequence with the length of 4, w(m), where $m \in \{0,1,2,3\}$ corresponds to each one of 4 data bearing symbols in the slot. There are three reference symbols in each slot (located in the middle symbols of the slot) that allow channel estimation for coherent demodulation of formats 1a/1b.

Similar to FDD, for TDD, the PUCCH resource which a UE is to use may be signalled via either implicit or explicit signaling.

In the case of implicit signaling, for a PDSCH transmission indicated by the detection of corresponding PDCCH or a PDCCH indicating downlink SPS release in sub-frame $n-k_i$, where $k_i \in K$ defined in Table 2, the PUCCH resource $n_{PUCCH,i}^{(1)} = (M-i-1) \cdot N_c + i \cdot N_{c+1} + n_{CCE,i} + N_{PUCCH}^{(1)}$, where c is selected from $\{0, 1, 2, 3\}$ such that $N_c \leq n_{CCE,i} < N_{c+1}$, where M is the number of elements in the set K defined in Table 2. $N_c = \max\{0, \lfloor [N_{RB}^{DL} \cdot (N_{sc}^{RB} \cdot c - 4)]/36 \rfloor\}$, $n_{CCE,i}$ is the number of the first control channel element (CCE) used for transmission of the corresponding PDCCH in subframe $n-k_i$, and $N_{PUCCH}^{(1)}$ is configured by higher layers.

Figure 6:
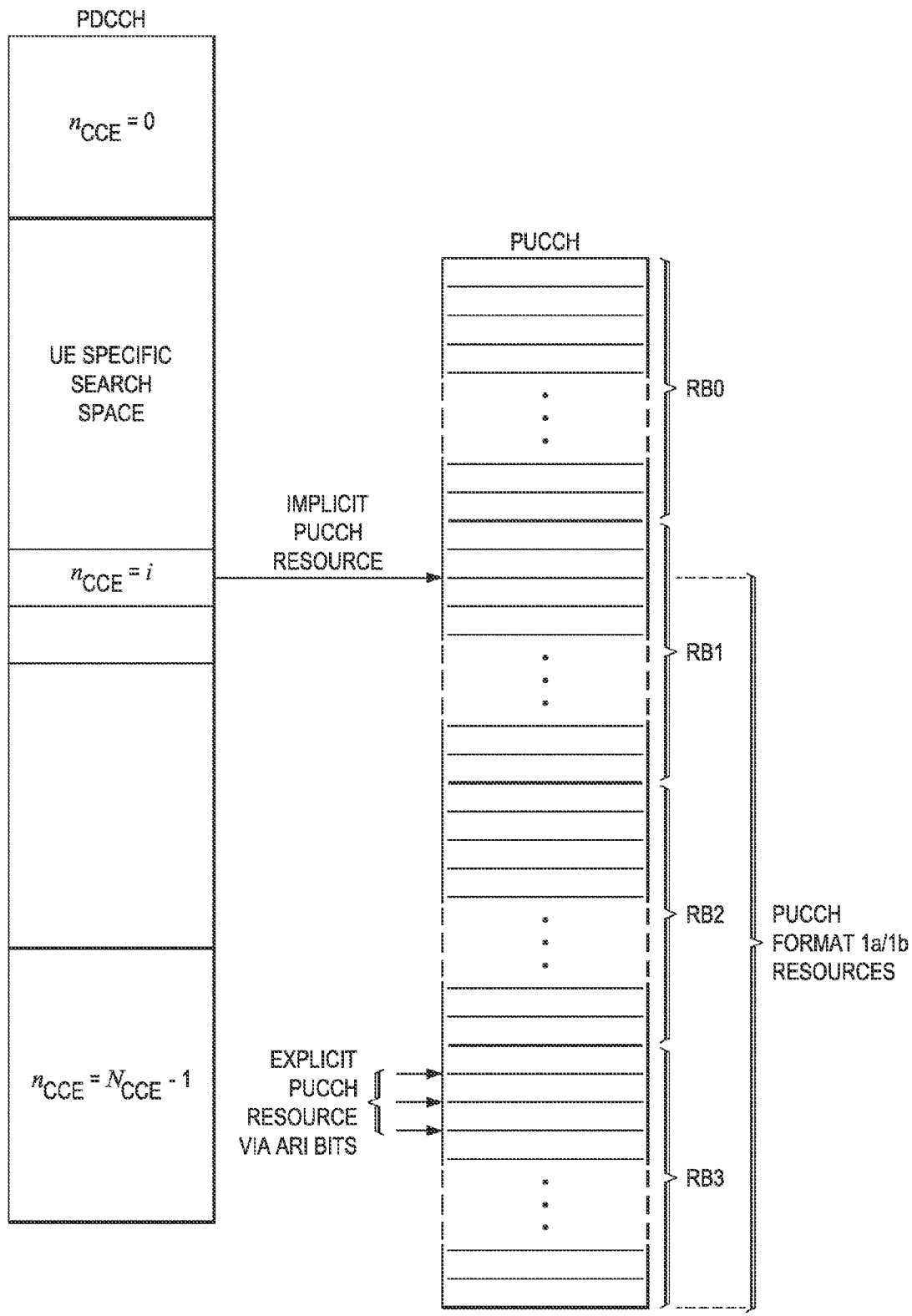
FIG. 6 is a schematic diagram showing an example physical uplink control channel resource mapping scheme.

In the case of explicit signalling, the PUCCH resource may be indicated via the ACK/NACK resource indicator (ARI)

bits and/or higher layer configuration. FIG. 6 illustrates the PUCCH resource mapping scheme. FIG. 6 is a schematic diagram showing an example physical uplink control channel resource mapping scheme. In carrier aggregation (CA), PUCCH resources may be signalled implicitly using the location of the scheduling grant for the UE on the PDCCH of its primary cell (PCell). PUCCH resources may also be explicitly indicated using the ARI bits contained in the grant for the UE on the PDCCH of one of the UE's secondary cells (SCells). In some implementations, resources of the SCell may be cross carrier scheduled by the PCell. For example, a PDCCH transmitted on PCell may provide scheduling for a PDSCH on SCell. In cross carrier scheduling, the PUCCH resource allocated to a UE may be implicitly signalled by the first CCE index of the PDCCH. In other implementations, the SCell is separate-scheduled by PDCCH on SCell itself (i.e. a PDCCH on SCell refers to a PDSCH grant also on SCell), and the PUCCH resource index is determined by the ARI bits in the grant transmitted on the SCell PDCCH.

LTE-Advanced Release-10 currently only supports CA when using the same UL/DL configuration on all the aggregated carriers. Inter-band carrier aggregation with different TDD UL/DL configurations on the carriers from different bands may facilitate the bandwidth flexibility and coexistence with legacy TDD systems.

It is noted that a component carrier (CC) is also known as a serving cell or a cell. Furthermore, when multiple CCs are scheduled, for each UE, one of the CCs can be designated as a primary carrier which is used for PUCCH transmission, semi-persistent scheduling, etc., while the remaining one or more CCs are configured as secondary CCs. This primary carrier is also known as primary cell (PCell), while the secondary CC is known as secondary cell (SCell). The timing linkage complexity in TDD systems increases, especially in view of CA with different TDD configurations, because with different TDD configurations, there are time instances with direction conflicting subframes among aggregated CCs (e.g. an UL subframe on CC1 at the same time as CC2 has a DL subframe). Also the timing linkage is different for each different TDD configuration and, furthermore, certain control signals have to be on a specific carrier, e.g. PUCCH has to be on PCell, etc. This may lead to a much greater control channel resource collision possibility in some scenarios.

Because PUCCH is transmitted on PCell in the case of inter-band CA with different UL/DL configurations, it increases the possibility of PUCCH resource collision. Described in this disclosure are two types of PUCCH resource collision. One type is that collision takes place between different UEs when ACK/NACKs from different UEs happen to use the same PUCCH resource, which may be referred to as a Type 1 collision or an inter-UE collision. Another type of collision occurs within the same UE when the PUCCH format 1a/1b resources from PCell and SCell are mapped onto the same PUCCH resource: this type of collision may be referred to as a Type 2 collision or an intra-UE collision. We consider both scenarios in this disclosure.

Figure 7A:
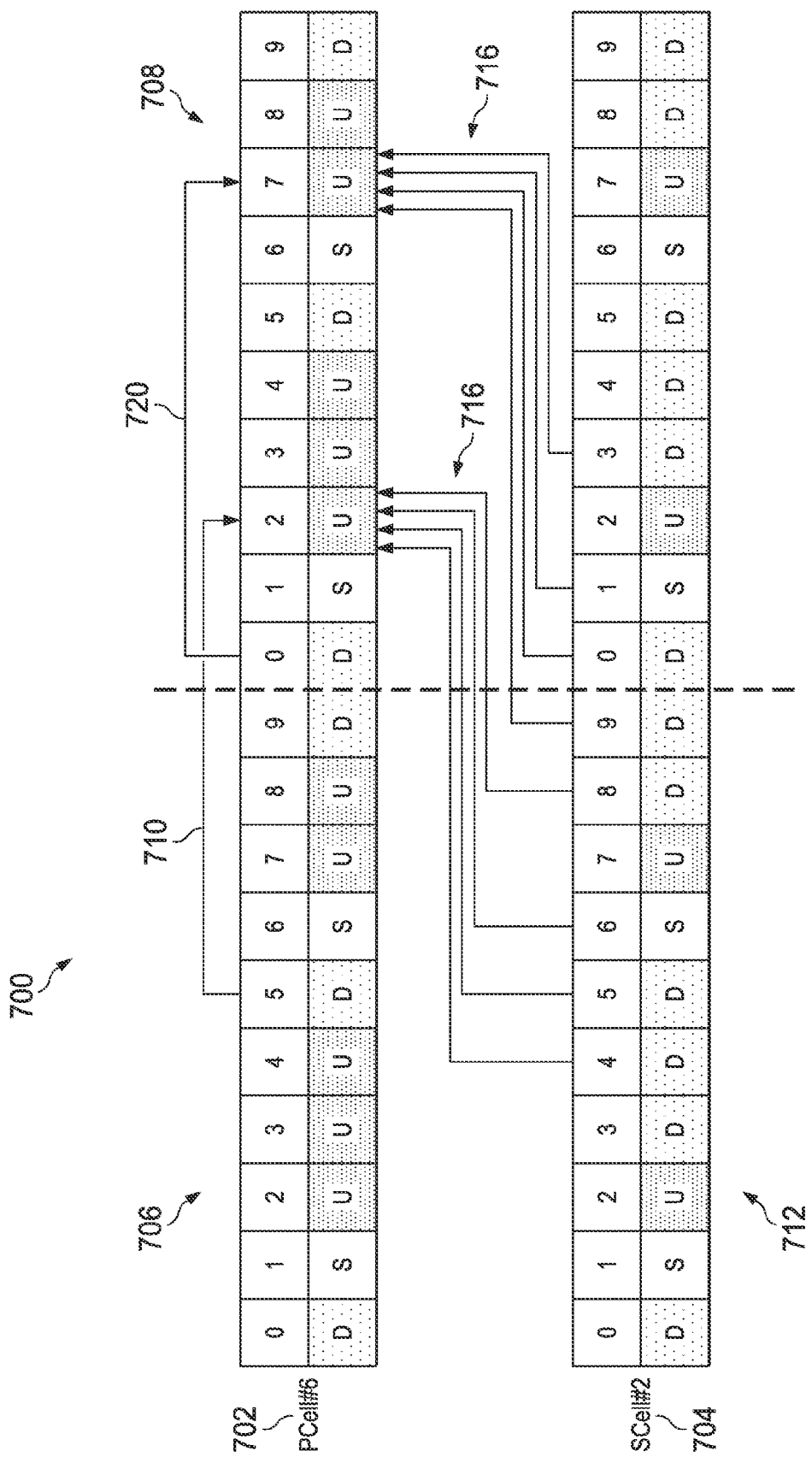
FIG. 7A is an example schematic diagram illustrating downlink hybrid automatic repeat request timing linkages in inter-band carrier aggregation with UL/DL configuration 6 on the primary cell and UL/DL configuration 2 on the secondary cell.

FIG. 7A is an example schematic diagram illustrating downlink hybrid automatic repeat request (HARQ) timing linkages in inter-band carrier aggregation. In FIG. 7A, a primary cell (PCell) is utilizing UL/DL configuration 6 and a secondary cell (SCell) is utilizing UL/DL configuration 2. In the example scenario shown in FIG. 7A, two TDD carriers are aggregated, and the PCell 702 is set as UL/DL configuration 6 and SCell 704 is with UL/DL configuration 2, in full duplex mode. PCell 702 follows its own DL HARQ timing relationship, which is UL/DL configuration 6, and SCell 704 DL HARQ follows the timing of UL/DL configuration 2. The PCell 702 is shown with PDCCH configuration 706 and PUCCH configuration 708; SCell 704 is shown with PDCCH configuration 712 (PDCCH may or may not be configured on SCell). The arrows 710 represent the DL HARQ timing for a first (e.g., non-CA legacy) UE served by PCell 702; while the arrows 716 represent the DL HARQ timing of SCell 704 for a second (e.g., CA) UE. A non-CA legacy UE on the carrier with UL/DL configuration 6 will follow the original Rel. 8/9/10 timing linkage of UL/DL configuration 6.

For legacy UEs on PCell PUCCH resource is determined by the first CCE for subframe 0 grant; while for CA UEs SCell PUCCH resources are based on four different subframes.

Turning to the PUCCH format 1a/1b resource at subframe #7 720 in FIG. 7A, for a legacy non-CA UE whose serving cell has UL/DL configuration 6, the PUCCH resource is determined by the first CCE index for transmission of the corresponding PDCCH in subframe #0 as described above. For a CA UE, it may require four PUCCH resources at subframe #7 720 for ACK/NACKs from four different PDSCH subframes, #9, #0, #1 and #3. In the case of cross carrier scheduling, these PUCCH resources are determined by the same fashion as described above, but the CCE indexes used in the calculation are from the different subframes for transmission of the corresponding PDCCHs. Therefore, it may result in the same PUCCH channel resource index for the non-CA UE and the CA UE at the same UL subframe.

Figure 7B:
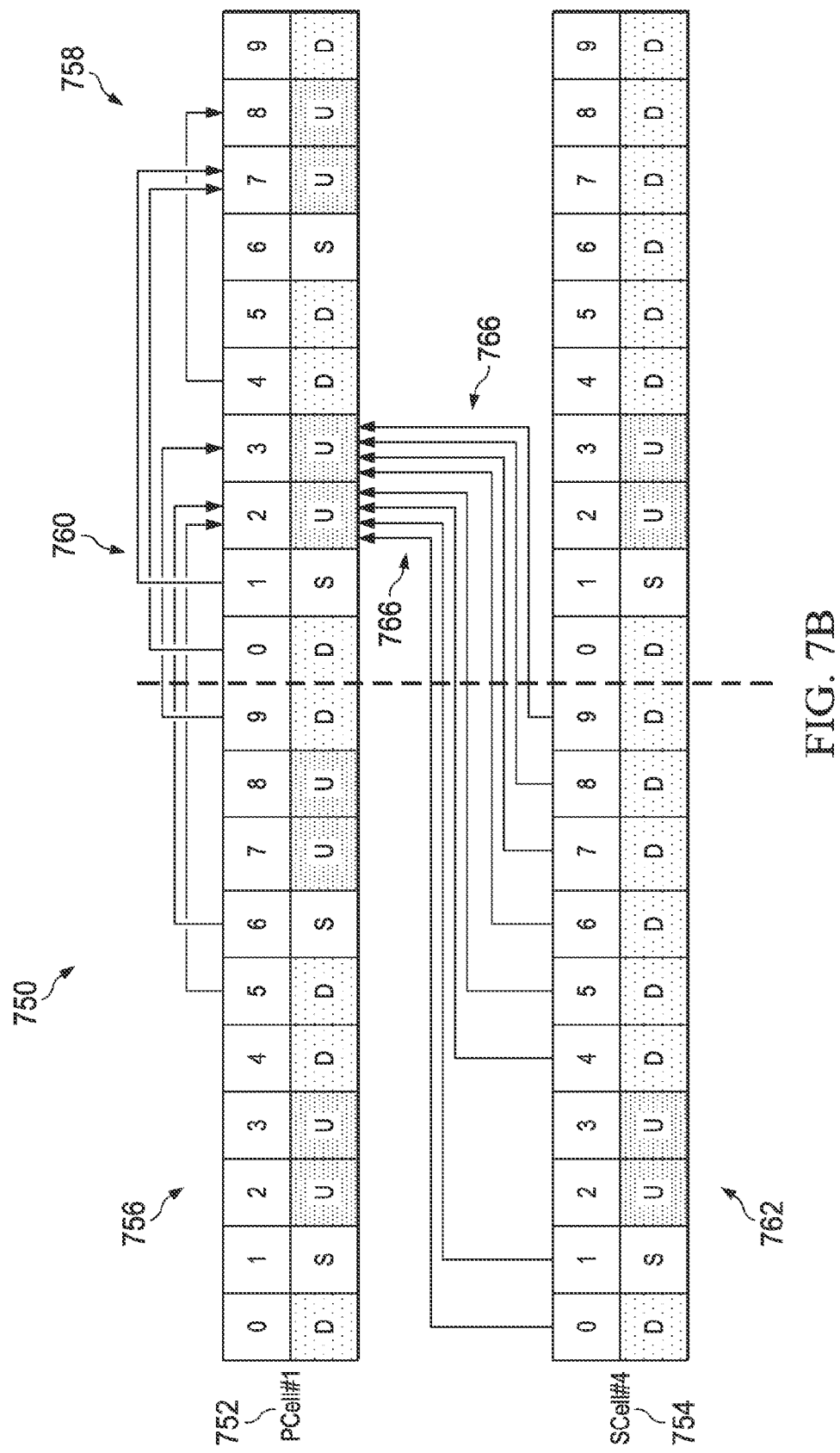
FIG. 7B is an example schematic diagram illustrating downlink hybrid automatic repeat request timing linkages in inter-band carrier aggregation with UL/DL configuration 1 on the primary cell and UL/DL configuration 4 on secondary cell.

FIG. 7B is an example schematic 750 diagram illustrating DL HARQ timing linkages in inter-band carrier aggregation with UL/DL configuration 1 on the PCell 752 and UL/DL configuration 4 on SCell 754. PCell 752 follows its own DL HARQ timing relationship, which is UL/DL configuration 1, and SCell 754 DL HARQ follows the timing of UL/DL configuration 4. The arrows 760 represent the DL HARQ timing of PCell 752, the arrows 766 represent the DL HARQ timing of SCell 754. PCell 752 includes PDCCH configuration 756 and PUCCH configuration 758. SCell 754 includes PDCCH configuration 762.

As shown in FIG. 7B, for cross carrier scheduling, the PUCCH format 1a/1b resources at subframes #2 are determined by the first CCE index for transmission of the corresponding PDCCH in subframes #5 and #6 of PCell 752 and subframes #0, #1, #4, #5 of SCell 754. Therefore, it may result in PUCCH resource collision between PCell 752 and SCell 754 within the CA UE at subframe 2. It should be understood that the PUCCH channel index mapped from different subframes may have the same number. In FIG. 7B, a potential PUCCH resource collision may also occur in subframe 3.

In one aspect of the present disclosure include, an algorithm can be used to determine PUCCH format 1a/1b resource mapping. The algorithm may be used throughout the system, or may be selectively used in the case of inter-band CA with different TDD UL/DL configurations. Because PUCCH is transmitted only on a single cell (PCell), we have to design a single PUCCH resource mapping rule which can be applied to all component carriers in CA.

In Table 2 above, each entry represents the downlink association set index K at a subframe n for a given UL/DL configuration. For convenience in expression, two additional indexes can be assigned to K: $K_{j,n}$, with n indicating subframe number in a frame (from 0 to 9) and j representing UL/DL configuration (from 0 to 6). For example, $K_{1,2}$ refers to the subframe 2 of a carrier using UL/DL configuration 1. Referring to the information of Table 2, the following expression should be understood as representing the downlink association set index K associated for UL/DL configuration 1, subframe 2: $K_{1,2}=\{7,6\}$. Similarly, the downlink association set index K for UL/DL configuration 2, subframe 2 is represented by the expression $K_{2,2}=\{8,7,4,6\}$. The downlink association set is null at any DL or special subframe.

Because the eNB assigns the location of PDCCH for the PDSCH grant and, in the implicit mapping case, the index of CCE for PDCCH determines the PUCCH resource, the eNB is able to track PDCCH allocation. If the eNB predictively detects that a PUCCH collision will occur (that is, it determines that a collision would occur for a given PDCCH assignment), a different PDCCH can be assigned to avoid the collision. In this way, eNB can predict and attempt to prevent collisions that might otherwise occur.

Figure 8:
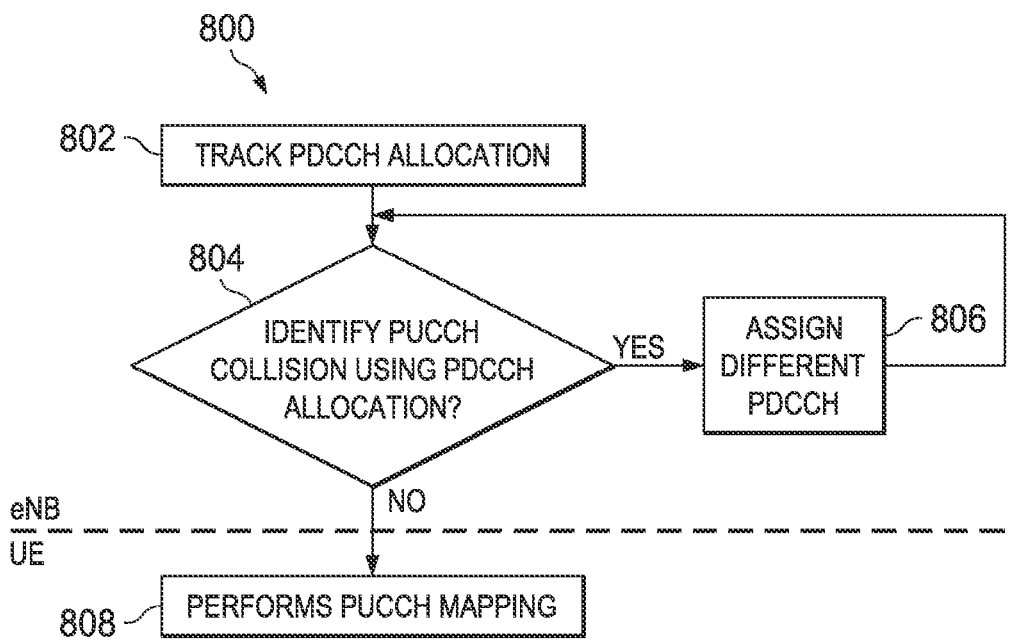
FIG. 8 is a process flowchart for assigning a PDCCH to avoid a resource collision.

FIG. 8 shows the flowchart of an example method performed by an eNB without the assistance of the UE. Shown in FIG. 8 is a process flowchart 800 for assigning a PDCCH to avoid a resource collision. The eNB can track PDCCH allocation (802). Based on tracking the PDCCH allocations the eNB can determine that an acknowledgement/negative acknowledgement (ACK/NACK) resource collision would occur on at least one uplink control channel for first or second carrier components (804). A second PDCCH can be identified to avoid the ACK/NACK resource collision (806). Herein, the term "identified" is meant to capture different functional aspects, such as choosing, selecting, receiving an indication of, determining, calculating, mapping, etc. The UE then uses the PDCCH allocation to perform PUCCH mapping (808) without any resource collisions.

In the process described in FIG. 8, the eNB can successfully prevent collisions, but the process may increase the complexity of the eNB scheduler. For example, the complexity of the eNB scheduler may be increased in the TDD system when eNB has to track PDCCH assignments across subframes to avoid collision. In an alternative process, to alleviate the burden on eNB scheduler, the eNB is only configured to detect the pending PUCCH resource collision and does not assign a different PDCCH to avoid it. Instead, it explicitly signals a PUCCH resource to resolve the collision. A method of using TPC bits can be used in this case. Two TPC bits are contained in all UE-specific Downlink Control Information (DCI) formats which are signalled on the PDCCH to indicate downlink (PDSCH) and uplink (PUSCH) grants to a UE. These TPC bits are normally used to perform uplink power control for PUCCH and PUSCH transmissions. However, when carrier aggregation is used, it may not be necessary to use the TPC bits in all signalled DCIs for power control purposes, and hence it is possible to reuse one or both of these TPC bits for other purposes when they are not required for power control. In case the SCell power is controlled with PCell, the TPC bits of SCell may be permanently redefined for the PUCCH resource allocation purpose. Alternatively, one or more TPC bits in a relevant DL DCI may be permanently redefined for the PUCCH resource allocation purpose, and power control can be achieved through the use of DCI 3/3A. The flowchart of this eNB assisted signalling method is presented in FIG. 9.

Figure 9:
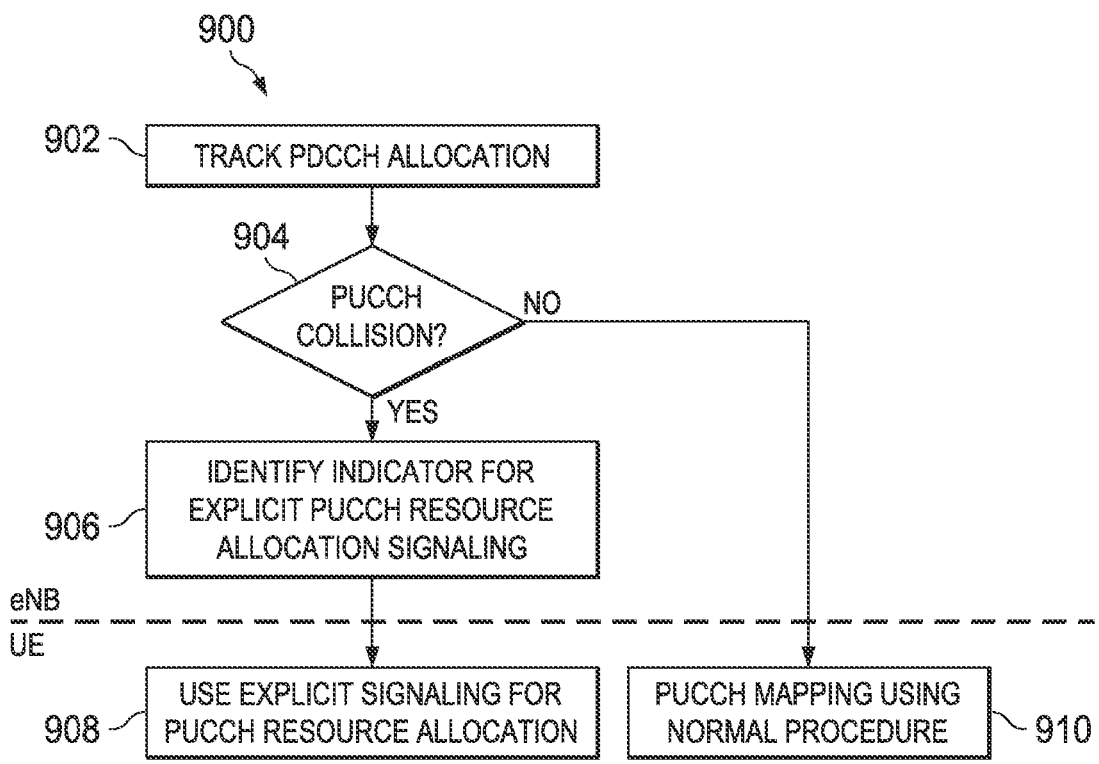
FIG. 9 is a process flowchart for an enhanced node B assisted signaling for PUCCH resource mapping.

FIG. 9 is a process flowchart 900 for an eNB assisted signalling for PUCCH resource mapping. The eNB may track the PDCCH allocation (902). If a potential PUCCH collision is identified (904), the eNB can identify an indicator for explicit PUCCH resource allocation signalling (906). The signaled indicator may then be used by the UE (908) to identify an alternate PUCCH resource allocation. The indicator may follow the TPC bit assignment as described herein. In certain implementation, the ACK/NACK Resource Indicator (ARI) bit(s) can be used to convey the exact location of PUCCH resource as is done for separate scheduling case in Rel 10. Table 5 below shows the correspondence between TPC bits (used as ARI bits) and PUCCH resource. Table 5 shows PUCCH resource values for HARQ ACK Resource for PUCCH.

TABLE 5

PUCCH Resource Value for HARQ-ACK Resource for PUCCH

| Value of 'TPC command for PUCCH' | $n_{PUCCH,j}^{(1)}$ or $(n_{PUCCH,j}^{(1)}, n_{PUCCH,j+1}^{(1)})$ |
|---|---|
| '00' | The 1st PUCCH resource value configured by the higher layers |
| '01' | The $2^{nd}$ PUCCH resource value configured by the higher layers |
| '10' | The $3^{rd}$ PUCCH resource value configured by the higher layers |
| '11' | The $4^{th}$ PUCCH resource value configured by the higher layers |

If a PUCCH collision would not occur, then the UE can use the PUCCH mapping from the previously identified PDCCH (910).

Figure 10:
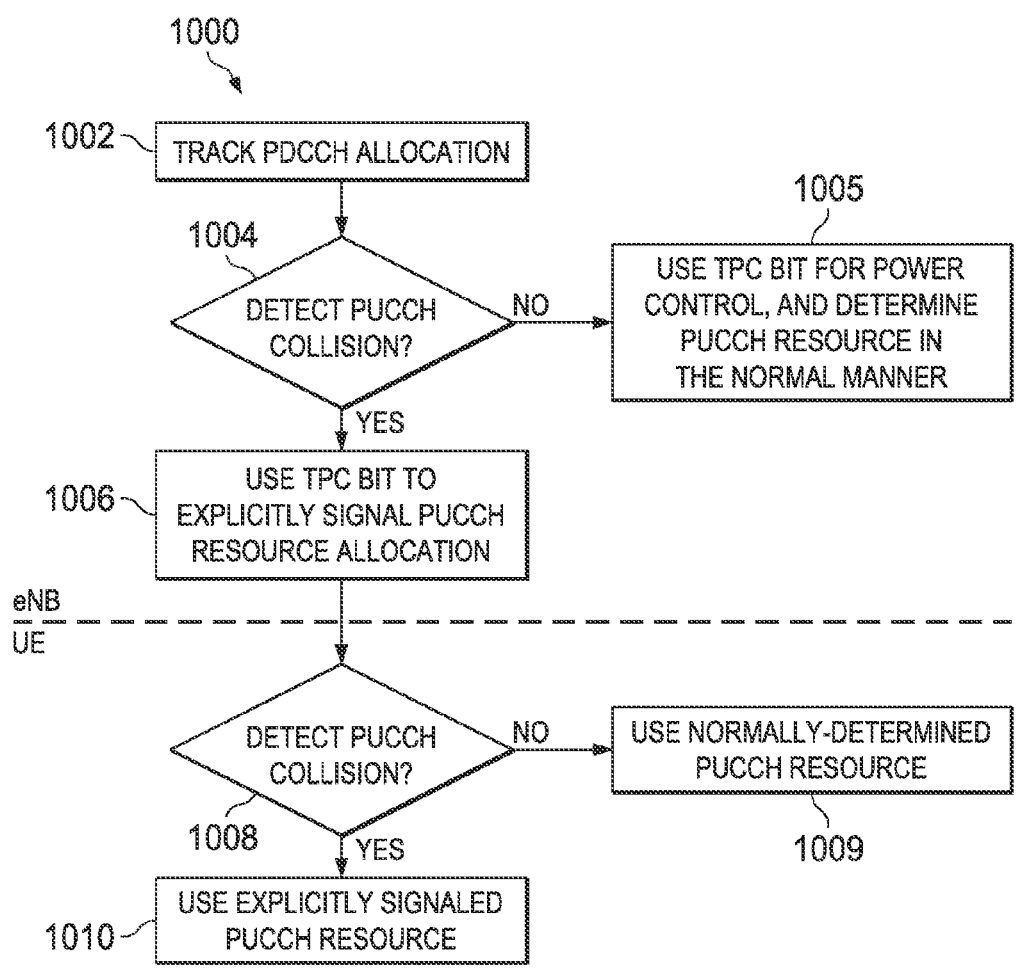
FIG. 10 is a process flowchart for enhanced node B assisted and UE detection for PUCCH resource mapping.

In certain implementations, the collision may be an intra-UE collision: a resource collision between carrier components (PCell and SCell(s)) of a single UE. The flowchart of this eNB assisted and UE detection method is presented in FIG. 10. FIG. 10 is a process flowchart 1000 for enhanced node B assisted and UE detection for PUCCH resource mapping. The eNB can track the PDCCH allocation (1002). The eNB may determine that a PUCCH resource collision would occur for a given PDCCH assignment (1004). If an intra-UE (Type 2) collision would not occur (using the normal calculations to determine PUCCH resources), then the UE uses those control bits for their originally intended purpose (e.g. power control) (1005) and uses the normally-determined PUCCH resource (using the legacy PUCCH resource calculations) for ACK/NACK transmission. If an intra-UE (Type 2) collision would occur (using the normal calculations to determine PUCCH resources), the UE can use those control bits to determine PUCCH index to avoid the collision and does not use those control bits for their originally intended purpose (1006). At the eNB, the eNB detects whether or not a PUCCH collision occurs (using the normal calculations to determine PUCCH resources) at 1008. If a PUCCH collision was detected at 1008, then the eNB receives ACK/NACK feedback from the UE on the explicitly signalled PUCCH resource at 1010. If a PUCCH collision was not detected at 1008, then the eNB receives ACK/NACK feedback from the UE on the normally-determined PUCCH resource at 1009. In certain implementations, if multiple control bits are available (e.g. 2 power control bits) and an intra-UE (Type 2) collision occurs (using the normal calculation to determine PUCCH resources), then a subset of these control bits (e.g. 1 bit) is used to determine the PUCCH index, while the remaining bits (e.g. 1 bit) are used for their originally intended purpose (e.g. determining a 1-bit power control command rather than a 2-bit command). If the UE does not detect a collision, the TPC bit can be used for power control (1009). The process of FIG. 10 addresses intra-UE type collisions because the UE is able to detect the collision among its own component carriers. The UE can receive the explicit signal (i.e., the indicator) and use it to identify the PUCCH resource. Herein, the term "identify" is meant to capture different functional aspects, such as choosing, selecting, receiving an indication of, determining, calculating, mapping, etc.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the disclosure.

What is claimed is:

1. A method performed in a base station of a wireless communications network, the method comprising:
    identifying a first downlink control channel;
    tracking a physical downlink control channel (PDCCH) allocations of uplink control channel resources transmitted to User Equipment (UE), wherein the uplink control channel resources include a first allocated uplink control channel resource and a second allocated uplink control channel resource;
    based on tracking the PDCCH allocations, determining an acknowledgement/negative acknowledgement (ACK/NACK) resource collision will occur at the UE between the first allocated uplink control channel resource and the second uplink control channel resource; and
    assigning, to the UE, a second downlink control channel that replaces the first downlink control channel and avoids the ACK/NACK resource collision.

2. The method of claim 1, wherein the second downlink control channel is different from the first downlink control channel.

3. The method of claim 1, wherein the second downlink control channel comprises a physical downlink control channel (PDCCH).

4. A method performed in a base station of a wireless communications network, the method comprising:
    identifying a first downlink control channel;
    tracking a physical downlink control channel (PDCCH) allocations of uplink control channel resources transmitted to User Equipment (UE);
    based on tracking the PDCCH allocations, determining an acknowledgement/negative acknowledgement (ACK/NACK) resource collision will potentially occur at the UE between a first uplink control channel for a first component carrier and a second uplink control channel for a second carrier component; and
    assigning, to the UE, a third uplink control channel that avoids the ACK/NACK resource collision.

5. The method of claim 4, wherein identifying the third uplink control channel comprises signaling the third uplink control channel different from the first uplink control channel.

6. The method of claim 5, further comprising signaling the third uplink control channel using at least one TPC bit associated with one or both of the first component carrier or the second component carrier.

7. The method of claim 5 wherein further comprising signaling the third uplink control channel using at least one transmit power control (TPC) bit of the second component carrier.

8. The method of claim 4, wherein the third uplink control channel comprises a physical uplink control channel (PUCCH).

9. A network element for a wireless communications network, the network element comprising:
    a processor operable to execute instructions comprising:
        identifying a first downlink control channel;
        tracking a physical downlink control channel (PDCCH) allocations of uplink control channel resources transmitted to User Equipment (UE)), wherein the uplink control channel resources include a first allocated uplink control channel resource and a second allocated uplink control channel resource;
        based on tracking the PDCCH allocations, determining an acknowledgement/negative acknowledgement (ACK/NACK) resource collision will occur at the UE between the first allocated uplink control channel resource and the second uplink control channel resource; and
        assigning, to the UE, a second downlink control channel that replaces the first downlink control channel and avoids the ACK/NACK resource collision.

10. The network element of claim 9, wherein the second downlink control channel is different from the first downlink control channel.

11. The network element of claim 9, wherein the second downlink control channel comprises a physical downlink control channel (PDCCH).

12. A network element for a wireless communications network, the network element comprising:
    a processor operable to execute instructions comprising:
        identifying a first downlink control channel;
        tracking a physical downlink control channel (PDCCH) allocations of uplink control channel resources transmitted to User Equipment (UE)), wherein the uplink control channel resources include a first allocated uplink control channel resource and a second allocated uplink control channel resource;
        based on tracking the PDCCH allocations, determining an acknowledgement/negative acknowledgement (ACK/NACK) resource collision will occur at the UE between the first allocated uplink control channel resource and the second uplink control channel resource; and
        assigning, to the UE, a third uplink control channel resource to avoid the ACK/NACK resource collision.

13. The network element of claim 12, wherein identifying the third uplink control channel comprises signaling the third uplink control channel different from the first uplink control channel.

14. The network element of claim 12, wherein the third uplink control channel comprises a physical uplink control channel (PUCCH).

15. The network element of claim 12, wherein further comprising communicating the third uplink control channel using at least one transmit power control (TPC) bit of the second component carrier.

16. The network element of claim 12, further comprising communicating the third uplink control channel using at least one TPC bit associated with one or both of the first component carrier or the second component carrier.

17. A method performed at a user equipment of a wireless communications network, the method comprising:
- receiving physical downlink control channel (PDCCH) allocations of uplink control channel resources transmitted to User Equipment (UE), wherein the uplink control channel resources include a first allocated uplink control channel resource and a second allocated uplink control channel resource;
- detecting, by the user equipment, a resource collision between uplink control channels for acknowledgement/negative acknowledgement (ACK/NACK) signaling of the first allocated uplink control channel resource and the second allocated uplink control channel resource; and
- using an explicitly identified ACK/NACK uplink control channel resource to transmit ACK/NACK signaling to a base station that avoids the resource collision.

18. The method of claim 17, further comprising receiving a signal from a base station explicitly identifying the ACK/NACK uplink control channel resource.

19. The method of claim 18, wherein the signal comprises at least one transmit power control (TPC) bit.

\* \* \* \* \*